(12) United States Patent
Frankel et al.

(10) Patent No.: US 10,131,185 B1
(45) Date of Patent: Nov. 20, 2018

(54) REMOVABLE CASTERS

(71) Applicant: Zenithen USA LLC, Upland, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Upland, CA (US)

( * ) Notice: Subject to any disclaimer, the term of this patent is extended or adjusted under 35 U.S.C. 154(b) by 0 days.

(21) Appl. No.: 15/729,687

(22) Filed: Oct. 11, 2017

(51) Int. Cl.
*B60B 33/00* (2006.01)

(52) U.S. Cl.
CPC ........ *B60B 33/0002* (2013.01); *B60B 33/001* (2013.01); *B60B 33/0039* (2013.01); *B60B 33/0049* (2013.01); *B60B 33/0068* (2013.01); *B60B 2900/115* (2013.01); *B60B 2900/351* (2013.01); *B60B 2900/521* (2013.01); *Y10T 16/191* (2015.01)

(58) Field of Classification Search
CPC ... B60B 33/001; B60B 33/0002; A45C 5/143; B65D 90/18
USPC .......................................................... 16/30
See application file for complete search history.

(56) References Cited

U.S. PATENT DOCUMENTS

| | | | | |
|---|---|---|---|---|
| 371,116 A * | 10/1887 | Wood et al. | ........ | B60B 33/0002 16/38 |
| 1,559,078 A * | 10/1925 | Everly | ................ | B60B 33/0002 16/23 |
| 2,169,882 A * | 8/1939 | Noelting | ............. | B60B 33/0002 16/38 |
| 3,199,141 A * | 8/1965 | Fontana | ............. | B60B 33/0002 16/18 R |
| 3,230,575 A * | 1/1966 | Schultz, Jr. | ......... | B60B 33/0002 16/38 |
| 4,422,212 A * | 12/1983 | Sheiman | ................ | A45C 5/143 16/29 |
| 4,854,602 A * | 8/1989 | Takeuchi | ................. | A45C 5/02 280/79.11 |
| 4,874,209 A * | 10/1989 | Spitzer | ................... | A47B 88/70 312/249.9 |
| 4,936,533 A * | 6/1990 | Adams | ...................... | B60R 1/04 248/222.11 |
| 5,331,717 A * | 7/1994 | Joslin | .................... | B60B 33/028 16/35 R |
| 5,509,172 A * | 4/1996 | Lauro | ................. | B60B 33/0002 16/30 |
| 6,024,416 A * | 2/2000 | Chen | ................... | B60B 33/0002 16/46 |
| 6,212,733 B1 * | 4/2001 | Yeh | ..................... | B60B 33/0002 16/35 R |
| 6,286,184 B1 * | 9/2001 | Dean | .................... | B60B 33/001 16/18 R |
| 7,931,284 B2 * | 4/2011 | Chiu | .................... | B60B 33/001 16/30 |

(Continued)

*Primary Examiner* — Jeffrey O'Brien
(74) *Attorney, Agent, or Firm* — Merek, Blackmon & Voorhees, LLC

(57) ABSTRACT

A removable caster system includes a roller, a roller frame and a roller seat, the roller being positioned on the frame via a horizontal axis, the frame being inserted into the vertical shaft hole of the seat through the vertical shaft to form a detachable position; wherein a chute is installed on the upper surface with a trapezoidal stopper; a wire retainer is placed in the chute and is controlled by the movement of its narrowing section or the vertical axis to achieve removable function.

8 Claims, 3 Drawing Sheets

(56) References Cited

U.S. PATENT DOCUMENTS

| | | | | |
|---|---|---|---|---|
| 8,002,363 B2 * | 8/2011 | Cheng | ............... | B60B 33/0002 16/30 |
| 8,251,391 B2 * | 8/2012 | Kohler | ............... | A61G 5/10 16/18 R |
| 8,590,984 B2 * | 11/2013 | Morris | ............... | B65F 1/1473 301/111.03 |
| 8,690,169 B2 * | 4/2014 | Lu | ............... | A45C 5/143 16/30 |
| 9,221,300 B1 * | 12/2015 | Pastore | ............... | B60B 33/00 |
| 9,221,301 B1 * | 12/2015 | Pastore | ............... | B60B 33/02 |
| 9,388,990 B2 * | 7/2016 | Kim | ............... | F24C 15/02 |
| 2003/0150080 A1 * | 8/2003 | Yang | ............... | B60B 33/0002 16/47 |
| 2004/0068831 A1 * | 4/2004 | Caruso | ............... | B60B 33/0002 16/18 R |
| 2005/0015928 A1 * | 1/2005 | Arsenault | ............... | B60B 33/0002 16/300 |

* cited by examiner

REMOVABLE CASTERS

BACKGROUND OF THE INVENTION

Field of the Invention

The present invention relates to detachable casters that are particularly suitable for use on luggage and trolleys for easy disassembly of packages.

Technical Background

The main function of the present removable caster is to save the space of packaging and transportation. When widely used in the field of luggage and trolleys, it not only saves the space for storage and transportation space for the manufacturer but also facilitates the use of consumers.

According to Chinese Application NO. 201611028392.8 in which a retractable trolley is disclosed, the four casters provided at the bottom are simply detachable and are directly inserted and pulled out of the end of the support shaft. Clamp sleeves are installed in order to prevent premature, fall-off accidents. But after a period of time, clamps tend to get loose and casters fall off prematurely. To this end, locks become one of the solutions that manufacturers seek.

Chinese Application No. 201410379966.0 discloses a detachable caster wheel comprising a wheel seat and a fixed seat. The wheel base is provided with a wheel, the wheel seat is provided with a rotating shaft, the wheel seat is connected to the first through hole installed on the bottom of the fixed base by a rotary shaft which has an annular groove on its upper end. The shaft is provided with a rotary base. The fixed seat is provided with a button device which includes a button plate of which one end is connected with a spring and the other end goes through the second through a hole installed on the side of the fixed seat. The button plate is provided with an arc-shaped hole to match the annular groove. The bottom of the fixed seat is provided with a guide groove to match the button plate. The housing cover is provided with an arc guide groove to match the spring and a guide groove to match the button plate.

Although the caster is removable, the matching mechanism of the button plate and spring have relatively complex structures which prove troublesome to assemble and disassemble as any such actions would require an action on the button plate. How to overcome the shortcomings of the existing technology, and invent a simple structure which is easy to assemble and disassemble is one object of the invention.

SUMMARY OF THE INVENTION

It is an objective of the present invention to provide a detachable caster that engages a trapezoidal stopper in a chute with a wire retainer that automatically opens the vertical shaft under an external force and which is capable of automatically clamping the inserted caster. A secondary objective is to provide a preload mechanism to keep the vertical shafts always close to the shaft holes.

The technical proposal of the invention can be achieved in at least the following way:

A removable caster, comprising:

A roller;

A roller frame which fixes the roller with a horizontal shaft at the bottom and a vertical shaft on top with an annular groove;

A roller seat provided with a vertical shaft hole to receive and position the inserted vertical shaft;

With the following features:

The upper face of the wheel seat has a chute with a trapezoidal stopper at its center. The waist extension line of the trapezoidal stopper is directed to the shaft hole;

A wire retainer bent into a bottle shape having a rectangular body, a neck and a narrowing section at the top; the wire retainer being placed in the chute with the neck installed on the waist of the trapezoidal stopper and the narrowing section is installed on the annular groove of the vertical shaft. As the neck and the waist of the stopper works together, the narrowing section opens and resets automatically.

An upper cover is locked to the top by means of a screw to ensure that the wire retainer can only slide laterally in the chute.

The groove on the wheel seat is provided with two symmetrical inner limiting blocks between the shaft hole and the stopper, which is arranged on both sides of the shaft hole. The upper end of the chute is provided with an outer limiting block; the narrowing section of the wire retainer has extensions which bend outwards away from each other and the bottom section of the stopper has an operating section which goes upwards. When the operating section is pulled outward, the extensions are brought into contact with the inner stopper block, and when the wire retainer is released, the extensions are brought back by recoil and into contact with the outer limit block.

The upper end of the stopper extends a guide block which is directed to the shaft hole, and the width of the guide block is less than or equal to the diameter of the groove of the vertical shaft.

The distance between the two inner limiting blocks is greater than or equal to the sum of the shaft hole diameter and twice the diameter of the wire retainer.

The wheel shaft hole is provided with a preload mechanism which always keeps the vertical shaft of the wheel frame in contact with the shaft hole.

The preload mechanism comprises a groove that is provided on one side of the shaft hole in which a preload spring and a preloading block are mounted and confined by a lid in the groove. As the preloading block is slightly protruding and has an arc surface conforming to the shaft hole, the circular surface is always brought into contact with the surface of the inserted sheave vertical shaft by means of the preload spring force.

The middle of the lid is provided with a bulge which presses against the surface of the preloading spring to keep it centered against the preloading block.

The invention utilizes a wire retainer which works with the trapezoidal stop in the chute to realize the self-locking of the vertical shaft of the roller. When the wire retainer is toggled, it is released as the trapezoidal stopper presses against it. The additional preload mechanism keeps constant contact between the vertical shaft and the shaft hole so as to reduce vibration. The detachable caster has the characteristics of clever structure, fewer spare parts, easier assembly and simpler operation, and can be widely used in trolleys, luggage or fixed objects when temporary mobility is needed.

BRIEF DESCRIPTION OF THE DRAWINGS

Similar reference characters denote corresponding features consistently throughout the attached drawings. Namely, in the drawings the following reference numbers refer to the following part.

1—roller
2—roller frame
21—vertical shaft
22—annular groove
3—roller seat
31—shaft hole
32—chute
33—trapezoidal stopper
331—guide block
34—inner limiting block
35—outer limiting block
36—groove
4—upper lid
5—wire retainer
51—trapezoidal section
511—operating section
52—neck section
53—narrowing section
531—extension
6—preload mechanism
61—preloading block
611—circular surface
62—preloading spring
63—lid
631—bulge
7—screw

DETAILED DESCRIPTION OF THE PREFERRED EMBODIMENT(S)

Figure 1:
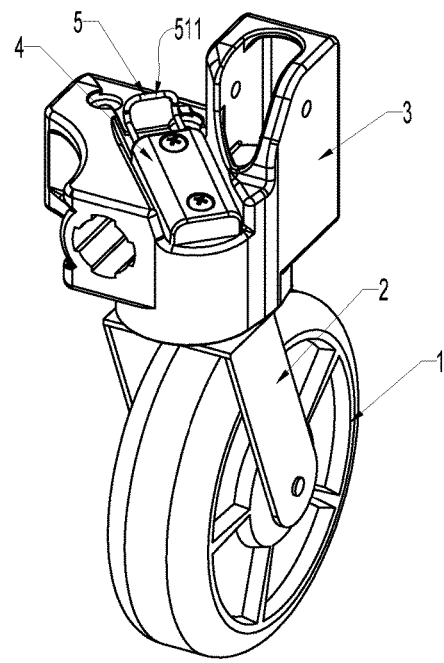
FIG. 1 shows a perspective view of a removable caster.
Figure 2:
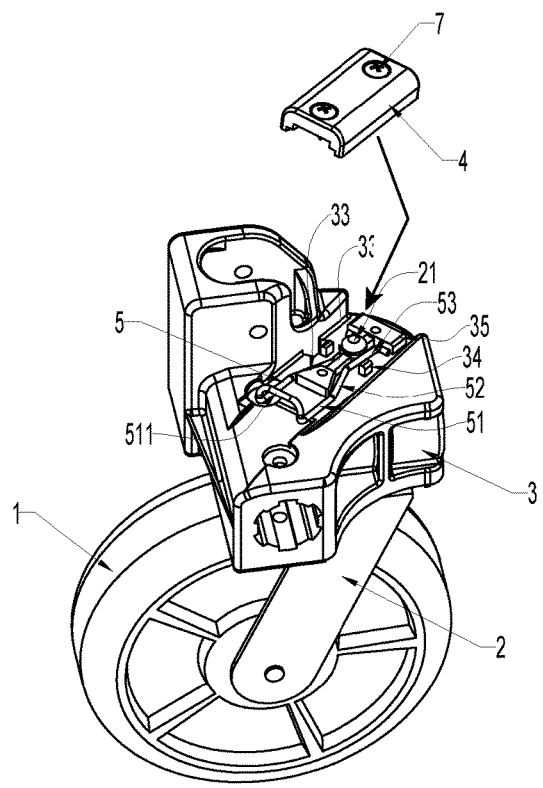
FIG. 2 shows an exploded view of the upper cap of detachable caster.
Figure 3:
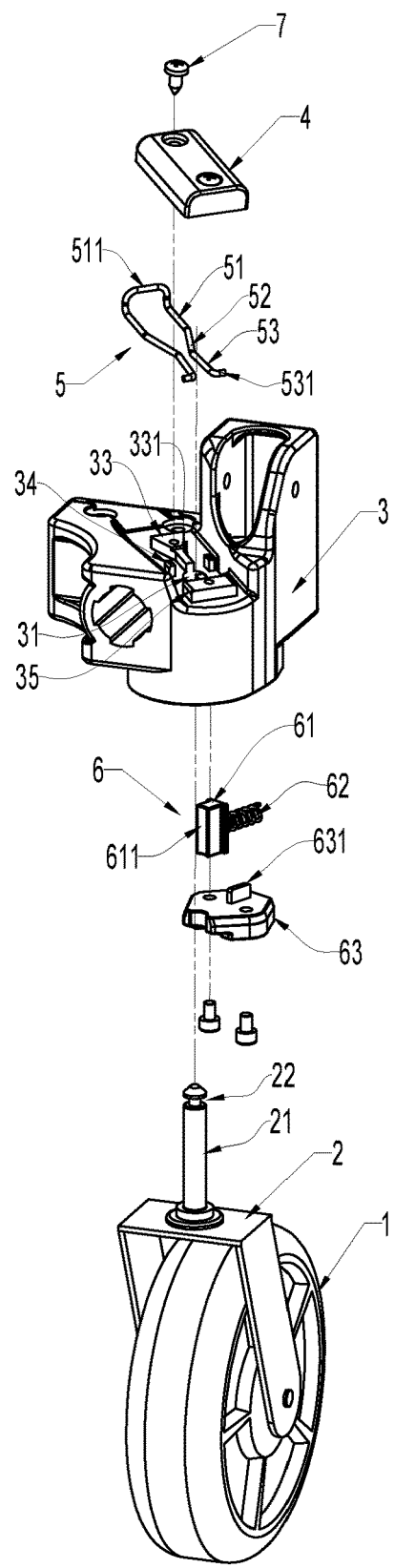
FIG. 3 shows an exploded view of the removable caster.

Referring to FIGS. 1, 2 and 3, a removable caster is show that includes a roller 1, a roller frame 2, a roller seat 3, an upper cover 4 and a wire retainer 5.

The roller frame 2 fixes the roller 1 with a horizontal shaft at the bottom as displayed or two rollers at both sides. The roller frame 2 has a vertical shaft 21 on top with an annular groove 22. A removable positioning structure is formed by the vertical shaft 21 and the roller seat 3.

The roller base 3 is provided with a vertical shaft hole 31 for receiving and positioning the inserted vertical shaft 21. The top surface of the seat 3 is provided with a chute 32 having a trapezoidal stop 33 in the center of the chute 32. The trapezoidal stop 33 is trapezoid-shaped. The shaft hole 31 is on the central axis of the chute 32.

Further, the chute 32 is provided with two symmetrical inner limiting blocks 34 between the shaft hole 31 and the trapezoidal stopper 33, and is spaced at both sides of the shaft hole 31. The distance between the inner stopper blocks 34 is less than or equal to the diameter of the groove of the vertical shaft. The end portion of the chute 32 is provided with an outer stopper block 35 for restricting the sliding range of the wire retainer 5 by the inner stopper block 34 and the outer stopper block 35. Further, a guide block 331 is extended at the bottom end of the trapezoidal stopper 33. The end of the guide block 331 is directed toward the shaft hole 31 and the leading block width is less than or equal to the diameter of the vertical shaft groove 22, as shown in FIG. 4.

A wire retainer 5, which is bent into a bottle shape, has a body 51 of the bottle, a neck section 52 and a narrowing portion 53. And at both ends of the narrowed portion 53, it has an extension 531 that bends outward and a bottom portion of the body 51 having an up-folding operating section 511. When assembling, the wire retainer 5 is placed in the chute 32 of the seat, the waist section of the block 33 is sandwiched and held at the center by the guide block 331, and finally the upper lid 4 is locked by the screw 7. The retainer 5 can only slide laterally in the chute 32.

The guide block 331, in addition to being centered, is used to hold the narrowing section 53 at a predetermined distance so that when the vertical axis 21 is inserted, the vertical axis 21 can smoothly slide into the ring groove 22 to automatically position without manual intervention.

Figure 4:
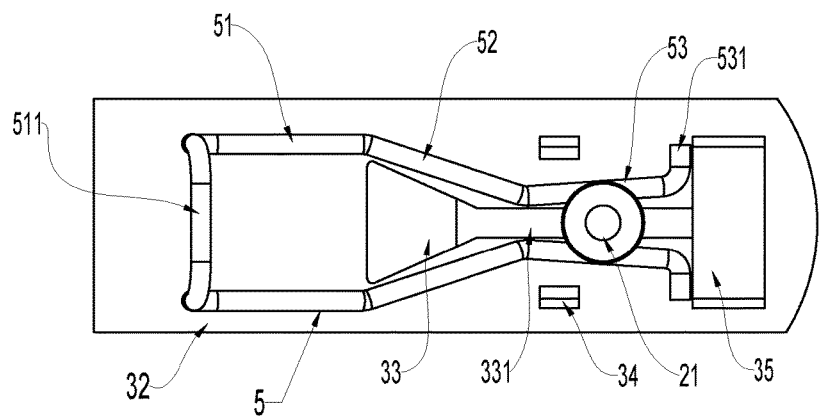
FIG. 4 shows the schematic diagram of the relationship between the wire retainer and the chute.

As in FIG. 4, when the operating portion 511 is pulled outward, the neck section 52 moves in relation with the waist portion of the trapezoidal stopper 33 so that the narrowing section 53 is opened and is moved until its extensions 531 abuts against the inner stopper block 34. When the wire retainer 5 is released, the neck section 52, with a tightening elastic force, recoils along the waist of the trapezoidal stopper 33 to the shaft hole until the extensions are in contact with the outer stopper 35, waiting for the next insertion of the vertical axis 21.

The vertical axis 21 and the shaft hole 31 are inevitably gapped due to the detachable functionality, and the gap is likely to produce movements and fluctuation. For this reason, the preload mechanism provided on the wheel seat 3 becomes necessary.

Figure 5:
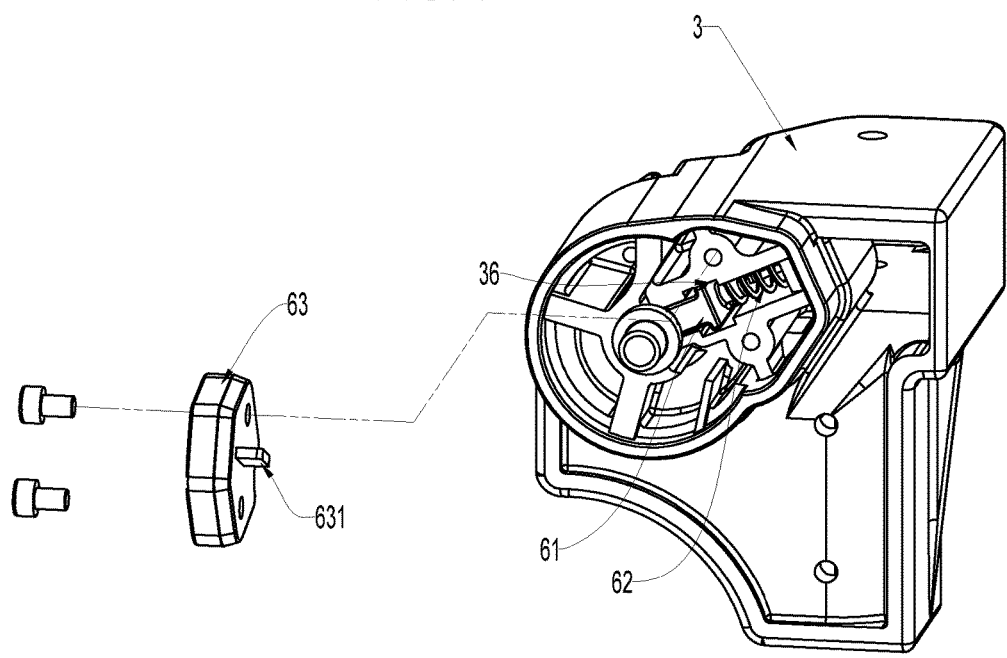
FIG. 5 shows an exploded view of the preload mechanism.

As shown in FIGS. 3 and 5, a preload mechanism 6 is provided on the roller shaft hole 31, and the preload mechanism 6 is provided with a groove 36 on one side of the shaft hole 31 The preloading block 61 and the preloading spring 62 are restrained in the groove 36 by a lid 63. A bulge 631 is provided in the middle of the lid 63 which abuts against the surface of the preloading spring 62 to hold it centered on the preloading block 61. As the preloading block 61 is slightly protruded and has an arcuate surface conforming to the shaft hole 31, the circular surface 611 is always brought into contact with the surface of the inserted sheave vertical shaft 21 by means of the preload spring force, to eliminate the gap between the two.

We claim:

1. A removable caster system comprising:
   a roller;
   a roller frame;
   a horizontal shaft rotatably connecting the roller to the roller frame;
   a roller seat configured to connect to a movable object, the roller seat defining a vertical shaft hole therein;
   a vertical shaft comprising an annular groove, the vertical shaft connecting the roller frame to the roller seat via the vertical shaft hole;
   the roller seat further comprising:
     an upper face having a channel extending substantially perpendicular to the vertical shaft hole;
     a guiding member having a trapezoidal stopper and a guide block, the trapezoidal stopper having a narrow end proximal to the vertical shaft hole and a wide end distal from the vertical shaft hole, the guide block extending from the narrow end of the trapezoidal stopper to the vertical shaft hole;
     a wire retainer formed of a bent wire and having an operational section distal from the vertical shaft hole and two legs extending towards the vertical shaft hole; the two legs each comprising a body section surrounding the wide end of the trapezoidal stopper, a tapered neck section extending between the trapezoidal stopper and the guide block, and a narrowing section which extends over the vertical shaft hole for receiving the annular groove of the vertical shaft therebetween;

wherein the wire retainer is configured to slide laterally along the channel between a first position, in which the narrowing section prevents removal of the vertical shaft from the vertical shaft hole, and a second position, in which the neck section is displaced with respect to the trapezoidal stopper and causes the narrowing section to spread apart allowing removal of the vertical shaft from the vertical shaft hole.

2. The removable caster system according to claim 1, wherein the wire retainer is a resilient member, such that an external force is applied to move the wire retainer from the first position to the second position, and upon release of the external force, the wire retainer is automatically biased back to the first position.

3. The removable caster system according to claim 1, further comprising an upper cover locked to the roller seat by a screw to ensure the wire retainer can only slide laterally in the channel.

4. The removable caster system according to claim 1, wherein the channel of the roller seat further comprises two symmetrical inner limiting blocks surrounding the vertical shaft hole and between the vertical shaft hole and the trapezoidal stopper; an outer limiting block; and the wire retainer legs each include a bent extension; wherein when the wire retainer is in the first position, the bent extensions engage the outer limiting block, and when the wire retainer is in the second position, the bent extensions engage the inner limiting blocks.

5. The removable caster system according to claim 1, wherein a width of the guide block is less than or equal to a diameter of the vertical shaft hole.

6. The removable caster system according to claim 1, wherein the roller seat further comprises a preload mechanism configured to bias the vertical shaft into engagement with the vertical shaft hole for preventing unwanted movements due to a gap therebetween.

7. The removable caster system according to claim 6, wherein the preload mechanism comprises a groove defined on one side of the vertical shaft hole; a preload spring and a preload block are mounted and confined in the groove by a lid; the preload block has an arcuate surface conforming to the vertical shaft hole; wherein the arcuate surface of the preload block is biased into contact with an arcuate surface of the vertical shaft by a force of the preload spring.

8. The removable caster system according to claim 7, wherein the lid of the preload mechanism further comprises a bulge portion which presses against a surface of the preload spring to keep the preload spring centered against the preload block.

\* \* \* \* \*